US010381659B2

(12) United States Patent
Yoshizawa

(10) Patent No.: US 10,381,659 B2
(45) Date of Patent: Aug. 13, 2019

(54) FUEL CELL

(75) Inventor: Koudai Yoshizawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 313 days.

(21) Appl. No.: 13/996,092

(22) PCT Filed: Nov. 17, 2011

(86) PCT No.: PCT/JP2011/076521

§ 371 (c)(1), (2), (4) Date: Jul. 8, 2013

(87) PCT Pub. No.: WO2012/090618

PCT Pub. Date: Jul. 5, 2012

(65) Prior Publication Data

US 2013/0288151 A1 Oct. 31, 2013

(30) Foreign Application Priority Data

Dec. 27, 2010 (JP) ................................ 2010-289600

(51) Int. Cl.

*H01M 8/02* (2016.01)
*H01M 8/10* (2016.01)
*H01M 8/026* (2016.01)
*H01M 8/0247* (2016.01)
*H01M 8/0265* (2016.01)
*H01M 8/1007* (2016.01)
(Continued)

(52) U.S. Cl.

CPC ......... *H01M 8/026* (2013.01); *H01M 8/0247* (2013.01); *H01M 8/0265* (2013.01);
(Continued)

(58) Field of Classification Search

CPC ............................ H01M 8/023; H01M 8/0258
See application file for complete search history.

(56) References Cited

U.S. PATENT DOCUMENTS

2005/0221152 A1* 10/2005 Turpin ................ H01M 4/8605 429/514
2010/0221633 A1* 9/2010 Fujita ................... H01M 8/241 429/452
(Continued)

FOREIGN PATENT DOCUMENTS

CA 2529799 A1 12/2004
CN 1809939 A 7/2006
(Continued)

OTHER PUBLICATIONS

International Search Report for International application No. PCT/JP2011/076521 dated Feb. 21, 2012.
(Continued)

*Primary Examiner* — Scott J. Chmielecki
(74) *Attorney, Agent, or Firm* — Global IP Counselors, LLP

(57) ABSTRACT

A fuel cell is provided that includes a cell structure, a pair of separators and a plurality of at least partially porous ribs. The cell structure includes an anode, a cathode and an electrolyte membrane, the anode and the cathode being laminated on opposite sides of the electrolyte membrane, respectively. The separators are disposed on both surfaces of the cell structure with gas passages being defined by the separators and the cell structure for circulating two types of gas for power generation. The porous ribs porous ribs are disposed successively on an entire cross-section of the gas passage in a transverse direction with a flow direction of the gas for power generation.

12 Claims, 10 Drawing Sheets

(51) Int. Cl.

| | |
|---|---|
| *H01M 8/0241* | (2016.01) |
| *H01M 8/0258* | (2016.01) |
| *H01M 4/86* | (2006.01) |
| *H01M 8/1018* | (2016.01) |

(52) U.S. Cl.
CPC .......... *H01M 8/1007* (2016.02); *H01M 4/861* (2013.01); *H01M 4/8626* (2013.01); *H01M 8/0241* (2013.01); *H01M 8/0258* (2013.01); *H01M 2004/8689* (2013.01); *H01M 2008/1095* (2013.01)

(56) References Cited

U.S. PATENT DOCUMENTS

| | | | | |
|---|---|---|---|---|
| 2011/0076590 A1* | 3/2011 | Kozakai ............. | H01M 8/0258 429/480 |
| 2011/0159399 A1* | 6/2011 | Kondo ............... | H01M 8/0228 429/480 |

FOREIGN PATENT DOCUMENTS

| | | | |
|---|---|---|---|
| JP | 2-155171 | A | 6/1990 |
| JP | 2008-027923 | A | 2/2008 |
| JP | 2008-146947 | A | 6/2008 |
| JP | 2009-26476 | A | 2/2009 |
| JP | 2010-129299 | A | 6/2010 |
| WO | 2004/114446 | A1 | 12/2004 |
| WO | 2005/109556 | A1 | 11/2005 |

OTHER PUBLICATIONS

The Chinese Office Action for the corresponding Chinese Application No. 201180062751.0 dated Dec. 31, 2014.
The Canadian Office Action for the corresponding Canadian Patent Application No. 2 824 623, dated Feb. 28, 2014.

* cited by examiner

FUEL CELL

This application is a U.S. National Stage of International Application No. PCT/JP2011/076521, filed Nov. 17, 2011. This application claims priority to Japanese Patent Application Nos. 2010-289600, filed on Dec. 15, 2010, and 2010-279808, filed on Dec. 27, 2010. The entire contents of these Japanese Patent applications are hereby incorporated herein by reference in their entirety.

BACKGROUND

Field of the Invention

The present invention relates to a fuel cell having a plurality of at least partially porous ribs disposed in a gas passage for circulating two types of gases for power generation.

Background Information

As this type of fuel cell, one configuration is disclosed as described in Japanese Laid-Open Patent Application Publication No. 2010-129299. The fuel cell described in this Japanese Patent Publication is provided with a separator substrate or base member and formed with a gas passage in the surface of the separator base member for gas for power generation. The fuel cell is further provided with a plurality of projections made of porous material including conductive particles of 0.5 μm to 50 μm particle diameter with the porosity of the projections within a range between 65 to 90%.

SUMMARY

However, in the conventional fuel cell that is described in the above mentioned Japanese Patent Publication, since the gas for power generation is likely to flow into the space between the projections than in the projections and the gas for power generation is less likely to pass into the projection, thus gas for power generation cannot diffuse into a catalyst layer near the projections so that the problem remains unsolved that the catalyst layer cannot function sufficiently.

The present invention has the purpose of providing a fuel cell that may increase the amount of gas for power generation passing through the porous body (porous rib) and may further improve the oxygen diffusibility into the catalyst layers near porous body and thereby increase cell voltage by reducing the resistance overvoltage.

In order to solve the problem described above, according to the present invention, two separators are disposed on both surfaces of a cell assembly comprised of anode and cathode laminated on both sides of electrolyte membrane, and passages are partitioned to be formed in the surfaces of the separators for circulating two types of gas for power generation. Further, a plurality of ribs which are made porous at least partly are disposed between each separator and the cell assembly, wherein at least part of the plurality of the porous ribs are disposed successively on the entire cross-section of gas channel in a direction crossing with the flow direction of the gas for power generation.

According to the present invention, since all of the gas for power generation passes through the porous ribs, the amount of gas for power generation passing through in the porous ribs may be increased with the oxygen gas diffusibility into the catalyst layer near the porous ribs improved, and cell voltage may be increased by reducing resistance overvoltage.

DETAILED DESCRIPTION OF THE EMBODIMENTS

Figure 1:
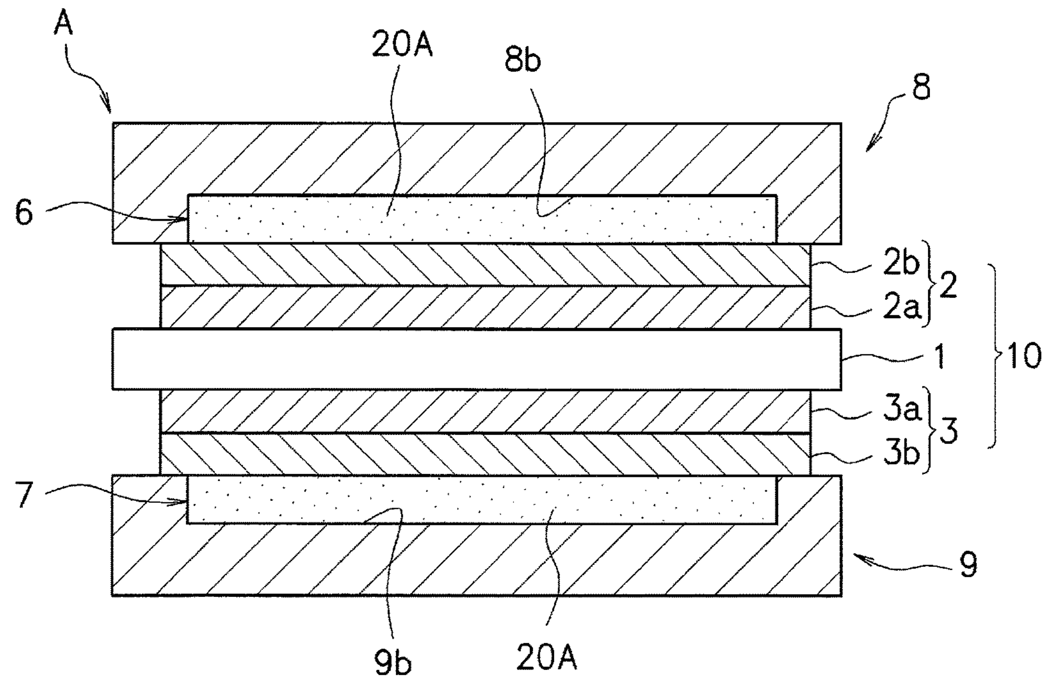
FIG. 1 is a cross-sectional view of a fuel cell in one embodiment according to the present invention.
Figure 2:
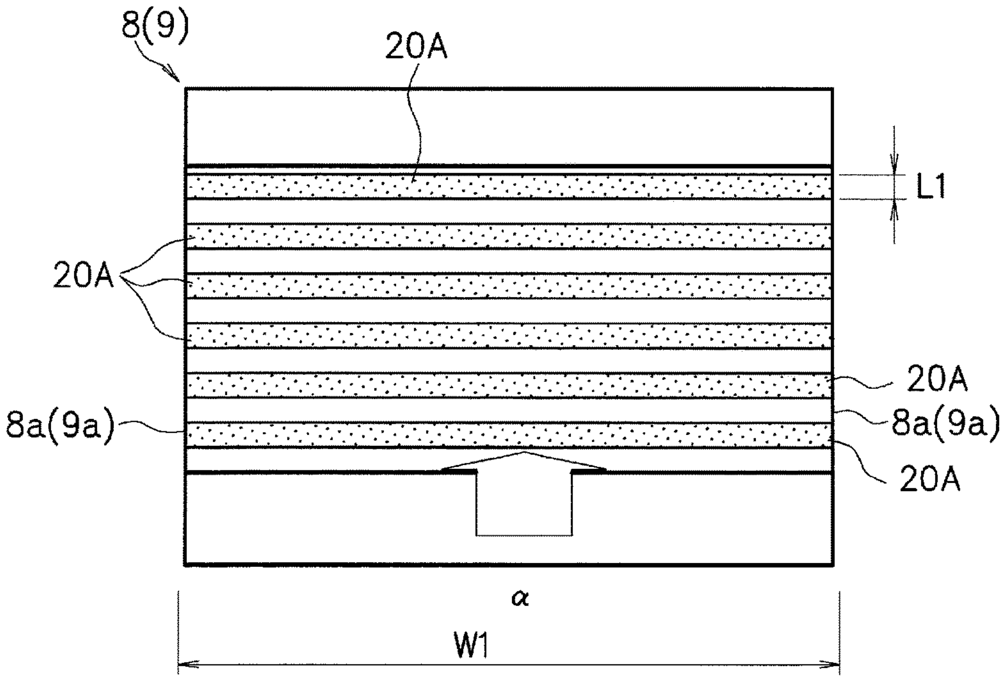
FIG. 2 is a plan view of a separator of the above fuel cell forming an example of array pattern of porous ribs.
Figure 3:
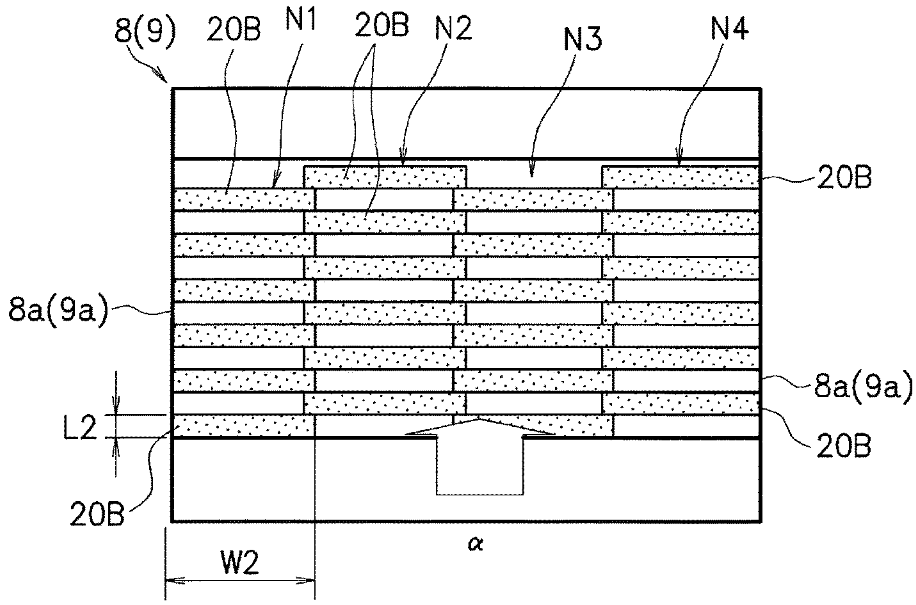
FIG. 3 is a plan view of a separator forming an array pattern of porous ribs pertaining to a first modification.

Configuration for carrying out the present invention is now described with reference to the drawings. FIG. 1 is a cross-sectional view of a fuel cell in one embodiment according to the present invention. FIG. 2 is a plan view of a separator of the above fuel cell forming an example of array pattern of porous ribs. FIG. 3 is a plan view of a separator forming an array pattern of porous ribs pertaining to a first modification.

As shown in FIG. 1, in the fuel cell A pertaining to the first embodiment according to the present invention, a pair of separators 8, 9 are disposed so that gas passages or channels 5, 7 for respectively circulating two types of gases for power generation on both surfaces of a cell assembly or structure 10.

The cell structure 10 is an integral structure formed with a cathode 2 and an anode 3 that are bonded on both sides of a solid polymer electrolyte 1. The cathode 2 has a two-layer structure with a cathode catalyst layer 2*a* and an anode gas diffusion layer 2*b*, and the cathode catalyst layer 2*a* is contacted with one surface of the solid polymer electrolyte membrane 1. The anode 3 has a two-layer structure with an anode catalyst 3*a* and an anode gas diffusion layer 3*b*, and the catalyst layer for fuel electrode is brought into contacted with the other surface of the solid polymer electrolyte membrane 1.

In the present embodiment, between the separators 8, 9 and the cell structure 10, i.e., in the gas passages or channels 6, 7 described above, a plurality of porous ribs 20A, 20A are respectively disposed which constitute an example of array pattern of porous ribs. Further, at least a portion of the porous ribs 20A is arrayed in a succession or continuously over the entire cross-section of gas passage in a direction crossing the flow direction of the gas for power generation. In the present embodiment, all the porous ribs 20A are disposed across the entire surface of cross-section of gas passages 6, 7 in a direction perpendicular to the flow direction of the gas for power generation.

First, in an example of array pattern of porous ribs 20A, porous rib 20A is structured by a body of porous metal which is made porous entirely with a predetermined porosity, and formed on the inner surfaces 8*b,* 9*b* of separator 8, 9 facing the cell structure 10.

As shown in FIG. 2, the porous rib described above is shaped in an elongate square pole with a length W1 along the long side extending between both peripheral edges 8*a,* 8*a* (9*a,* 9*a*) of separator 8(9) (hereinafter referred to as "rib width") as well as a length of short side (L1), (hereinafter, called "rib lengths") in the flow direction a of the gas for power generation.

That is, in the present embodiment, a plurality of porous ribs 20A are arranged or arrayed with a predetermined interval in the flow direction $\alpha$ so that all the gas for power generation passes through porous ribs 20A. In addition, with respect to relationship between porous ribs 20A and gas passage or channel 6 (7), the ratio of gas passage 6, 7 compared to the volume of the porous ribs 20A is set between 1 and 3.

Note that the "predetermined interval" may include, in addition to a constant or regular interval, further with respect to flow direction a from upstream to downstream, such an array with gradual decrease in intervals, or conversely, with gradual increase in intervals. It should be noted that, in addition to the regular intervals from the upstream side toward the downstream side of each flow direction a, ribs are also spaced so as to be gradually narrower, for example, "a predetermined distance", and this is gradually wider spacing to be reversed and the like in which to array.

By the array pattern of porous ribs describe above, all the gas for power generation flowing through the fuel cell A may be configured to pass porous ribs 20A. Therefore, the amount of gas that passes through inside the porous ribs 20A may be increased with the improved diffusibilty of oxygen into the catalyst layer near the porous ribs 20A and the voltage increase of fuel cell A may be achieved by reducing resistance overvoltage.

In the array pattern of porous ribs pertaining to the first modification in FIG. 3, similar to the porous rib 20A above, porous ribs 20B are entirely formed in the porous metal body with a required gas permeability and formed on the inner surfaces 8*a,* 9*b* of the separators 8, 9 facing the cell structure 10.

The porous rib 20B constituting an array pattern of porous ribs pertaining to the first modification is formed into an elongate square pole and has a length along long edge (referred to as "rib width") by dividing the length extending between both side edges 8, 8*a* (9, 9*a*) of separator 8 (9) into a plurality to rib width W2, and has a length L2 along the flow direction a of gas for power generation.

The porous ribs are arranged in four rows indicated by reference signs, N1~N4, and then the interval between adjacent rows is designed slightly shorter than the rib width W2 of porous rib 20B disposed with a predetermined interval between the plurality of ribs in the flowing direction $\alpha$. In other words, the porous ribs 20B are arranged across the entire cross-section of gas passages 6, 7 perpendicular to the flow of direction of gas for power generation.

By making up the array pattern of porous ribs 20B as described above, all the gas for power generation may be forced to pass through the porous ribs 20B. Therefore, the amount of gas for power generation passing through porous rib 20B may be increased, and oxygen diffusibilty into catalyst layer near the porous ribs 20B may be improved with increase of cell voltage due to reduction in resistance overvoltage. Further, since the array pattern in the first modification is in so called a staggered manner, pressure loss may be reduced.

Figure 4:
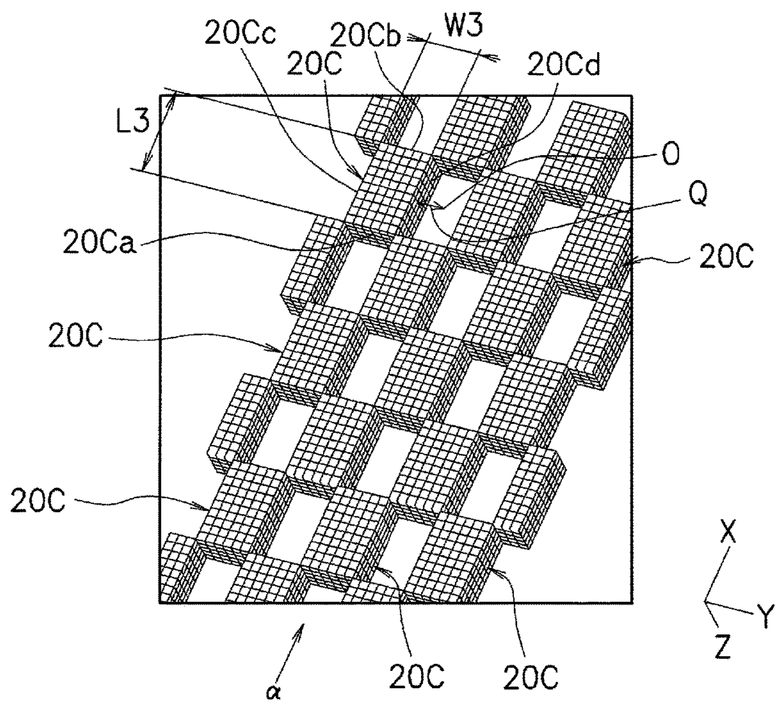
FIG. 4 is a partial perspective view showing an array pattern of porous ribs pertaining to a second modification.
Figure 5:
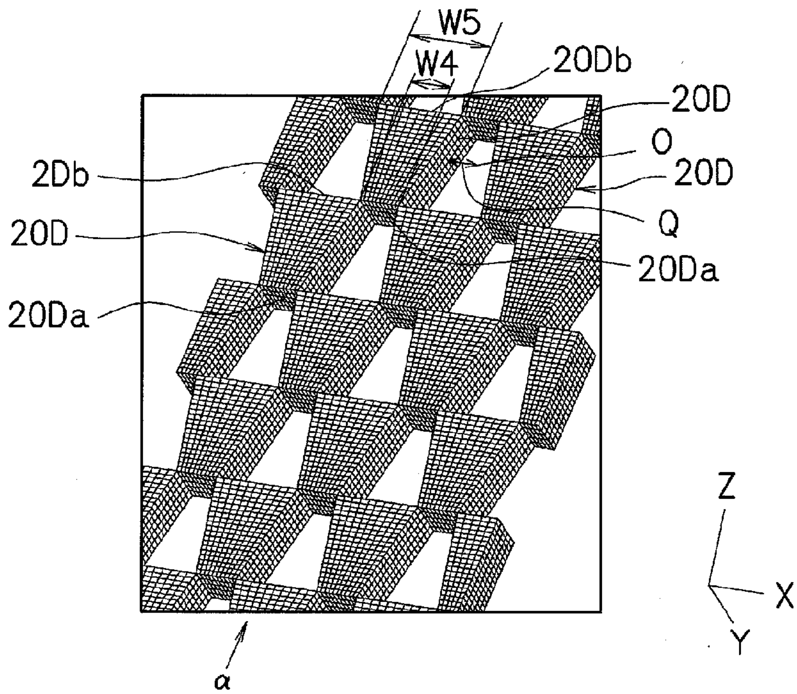
FIG. 5 is a partial perspective view showing an array pattern of porous ribs pertaining to a third modification.

FIG. 4 is a partial perspective view showing an array pattern of porous ribs pertaining to a second modification. FIG. 5 is a partial perspective view showing an array pattern of porous ribs pertaining to a third modification.

The porous ribs 20C constituting an array pattern of porous ribs pertaining to the second modification shown in FIG. 4 is similar to the porous ribs 20A, 20B in that the porous ribs 20C are disposed between the separators 8, 9 described above and cell structure 10, i.e., in the gas passages or channels 6, 7.

The porous rib 20C constituting the array pattern of porous ribs pertaining to the present example has a length W3 of side edges at upstream and downstream sides, 20Ca, 20Cb (hereinafter, referred to as "rib width") perpendicular to the flow of direction a, and a length L3 of the edges 20Cc, 20Cd parallel to the flow of direction a (hereinafter referred to as "rib length") L3, and formed of rectangular shape with a predetermined thickness.

In the present example, the rib width W3 of upstream and downstream side edges 20Ca, 20Cb Is set to less than 100 μm with an average rib width W3 of upstream and downstream side edges 20Ca, 20Cb and side edge 20Cc, 20Cd being set to generally equal to rib length L3. In other words, an aspect ratio of upstream, downstream side edge 20Ca, 20Cb to edge 20Cc, 20Cd is set to approximately 1.

Further, with respect to porous ribs 20C and gas passage 6 (7), a ratio of the volume of gas passage with respect to volume of porous ribs 20C is set between 1 and 3, and porous ribs are arranged to form a staggered pattern in which the apex portions contact each other. In other words, porous ribs are arranged in the gas passage 6, 7 across the entire cross-section area of gas passage 6, 7 perpendicular to the flow direction of gas for power generation. Furthermore, in the flow path or passage formed between the adjacent porous ribs 20C, 20C, the minimum length Q between the side surface of upstream and downstream side edges 20Cc, 20Cd and the center of flow passage O is equal to or less than 200 μm.

By making up the array pattern of porous ribs 20C as described above, all the gas for power generation may be forced to pass through the porous ribs 20C. Although the average velocity of gas for power generation passing through porous ribs 20C is less than the average velocity of gas for power generation circulating the surrounding space, it is possible to increase the amount of gas for power generation passing through the porous ribs 20C and oxygen diffusibilty into the catalyst layers near the porous ribs 20 may be increased with achieving increase in cell voltage by reducing resistance overvoltage.

The porous ribs 20D constituting an array pattern of porous ribs pertaining to the third modification shown in FIG. 5 is similar to the porous ribs 20A to 20C in that the porous ribs 20D are disposed between the separators 8, 9 described above and cell structure 10, i.e., in the gas passages or channels 6, 7.

The porous rib 20D constituting the array pattern of porous ribs pertaining to the present example is formed in a trapezoidal shape in plan view of a predetermined thickness and with the length W4, W5 (hereinafter referred to "rib width") along the edge 20Da, 20Db perpendicular to the flow direction a described above such that W4 is less than W5 (i.e., W4<W5). In other words, with respect to the flow direction a of gas for power generation, the gas passage area is shaped or configured to increase.

Further, with respect to porous ribs 20D and gas passage 6 (7), a ratio of the volume of gas passage with respect to volume of porous ribs 20D is set between 1 and 3, and porous ribs are arranged to form a staggered pattern in which the apex portions contact each other. In other words, porous ribs are arranged in the gas passage 6, 7 across the entire cross-section area of gas passage 6, 7 perpendicular to the flow direction of gas for power generation.

By making up the array pattern of porous ribs 20D as described above, all the gas for power generation may be forced to pass through the porous ribs 20D. Although the average velocity of gas for power generation passing through porous ribs 20D is less than the average velocity of gas for power generation circulating the surrounding space, it is possible to increase the amount of gas for power generation passing through the porous ribs 20D and oxygen diffusibilty into the catalyst layers near the porous ribs 20 may be increased while achieving increase in cell voltage by reducing resistance overvoltage.

Further, in the porous ribs 20D, since the passage area of the gas for power generation is shaped to increase with respect to the flow directionα α from the upstream side to the downstream side, the gas for power generation passing through the porous rib 20D is imparted directivity. Furthermore, by passing obliquely in the porous rib 20D, even with such a porous rib with low permeability with respect to gas passage, the flow velocity of gas for power generation may be increased.

Figure 6:
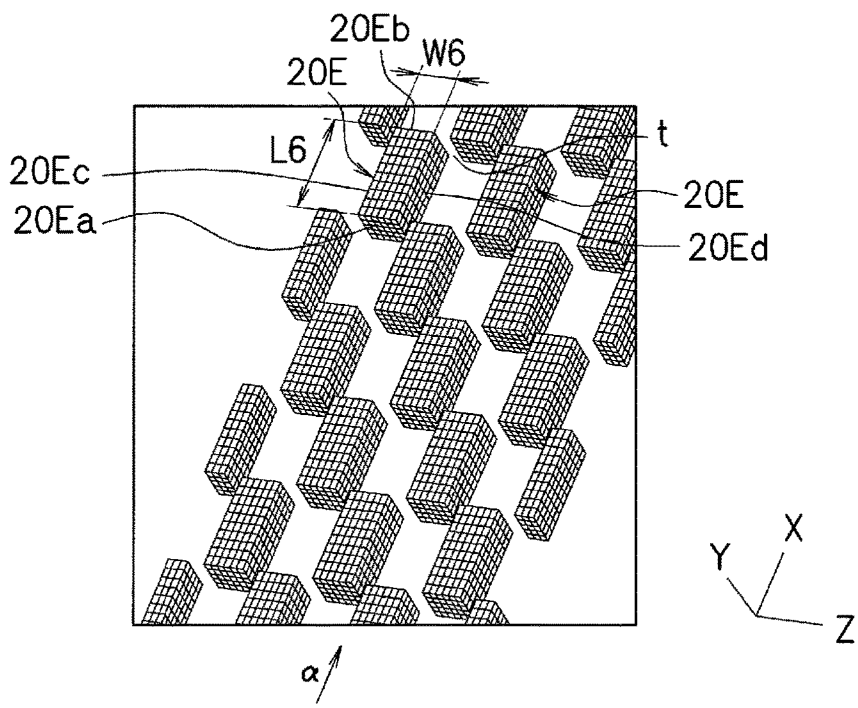
FIG. 6 is a partial perspective view showing an array pattern of porous ribs pertaining to a comparative example.
Figure 7:
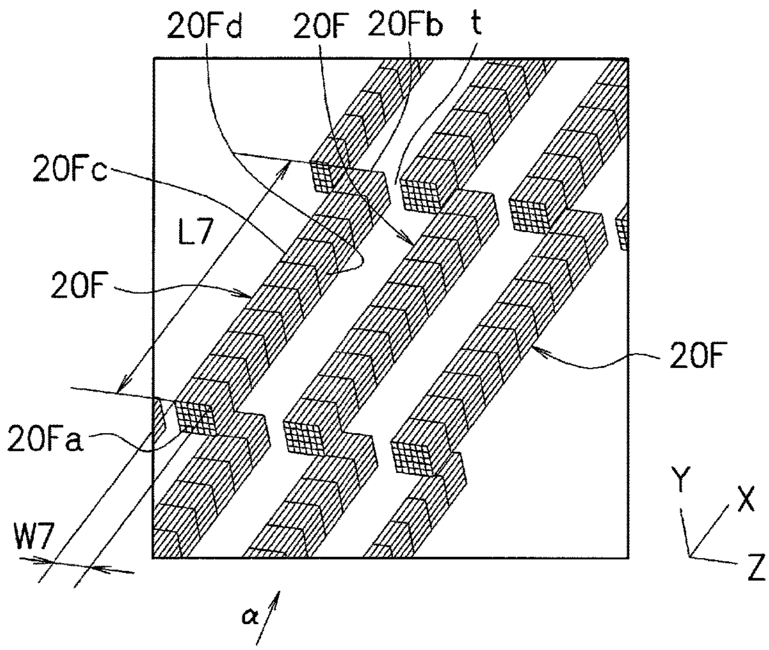
FIG. 7 is a partial perspective view showing a porous rib pertaining to the comparative example and an array pattern thereof.

FIG. 6 is a partial perspective view showing an array pattern of porous ribs pertaining to a comparative example. FIG. 7 is a partial perspective view showing a porous rib pertaining to the comparative example and an array pattern thereof.

The porous ribs 20E pertaining to comparative example shown in FIG. 6 is similar to the porous ribs 20A to 20D in that the porous ribs 20E are disposed between the separators 8, 9 described above and cell structure 10, i.e., in the gas passages or channels 6, 7.

The porous rib 20E pertaining to the present example has a rib width W6 of the upstream and downstream side edges 20Ea, 20Eb perpendicular to the flow direction α described above and rib length L6 of edges 20Ec, 20Ed parallel to the flow direction α, and further formed in rectangular shape of required thickness.

The porous rib 20E pertaining to the present example has set the rib width W6 of the upstream and downstream side edges 20Ea, 20Eb at 100 μm or less, and the average rib width and rib length measured along upstream and downstream side edges 20Ea, 20Eb, and edges 20Ec, 20Ed, respectively, are configured to be generally equal.

Further, with respect to porous ribs 20E and gas passage 6 (7), a ratio of the volume of gas passage with respect to volume of porous ribs 20D is set between 1 and 3, and porous ribs are arranged to form a staggered pattern in which the apex portions are spaced apart from each other by a predetermined gas t. More specifically, the gap t is set smaller than the rib width W6 of each porous rib 20E.

By making up the array pattern of porous ribs 20E as described above, almost all the gas for power generation may be forced to pass through the porous ribs 20E. Although the average velocity of gas for power generation passing through porous ribs 20E is less than the average velocity of gas for power generation circulating the surrounding space, it is possible to increase the amount of gas for power generation passing through the porous ribs 20E and oxygen diffusibilty into the catalyst layers near the porous ribs 20 may be increased with achieving increase in cell voltage by reducing resistance overvoltage.

The porous ribs 20F pertaining to comparative example shown in FIG. 7 is similar to the porous ribs 20A to 20E in that the porous ribs 20F are disposed between the separators 8, 9 described above and cell structure 10, i.e., in the gas passages or channels 6, 7.

The porous rib 20F pertaining to the present example has a rib width W7 of the upstream and downstream side edges 20Fa, 20Fb perpendicular to the flow direction α described above and rib length L7 of edges 20Fc, 20Fd parallel to the flow direction α, and further formed in rectangular shape of required thickness The porous rib 20F pertaining to the present example has set the rib width W7 of the upstream and downstream side edges 20Fa, 20Fb at 100 μm or less, and, with respect to porous ribs 20F and gas passage 6 (7), a ratio of the volume of gas passage with respect to volume of porous ribs 20F is set beyond 3. Thus, compared to the arrangement with the ratio between 1 and 3, the structure is less vulnerable to damage.

Further, the porous ribs pertaining to this example are arranged to form a staggered pattern in which the apex portions are spaced apart from each other by a predetermined gas t.
More specifically, the gap t is set smaller than the rib width W7 of each porous rib 20E.

Figure 8:
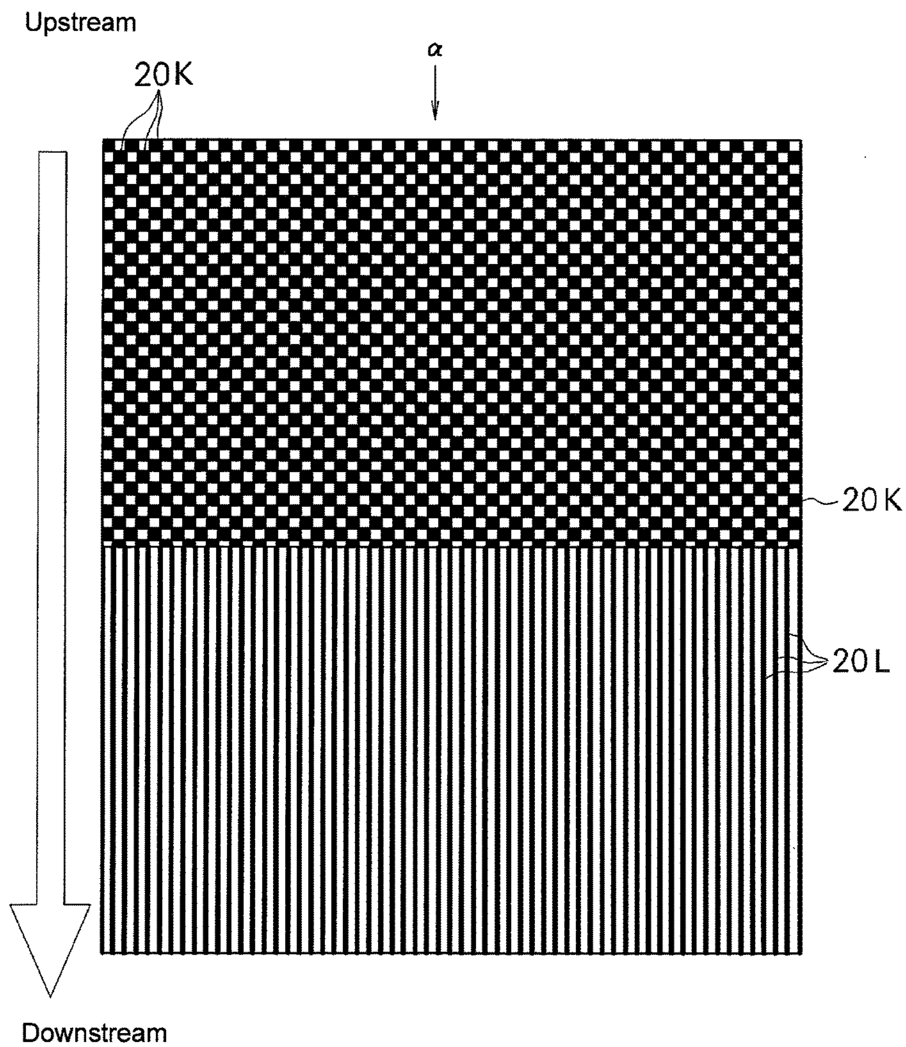
FIG. 8 is an explanatory diagram showing an array pattern of porous ribs pertaining to a fourth modification.

FIG. 8 is an explanatory diagram showing an array pattern of porous ribs pertaining to a fourth modification. In the array pattern of porous ribs pertaining to the fourth modification, on a half portion upstream with respect to flow direction α of gas for power generation, as in the array pattern of porous ribs according to either first modification or second modification, porous ribs 20K are arranged in a staggered manner with the adjacent porous ribs 20K contacting closely each other whereas on the other half portion downstream with respect to the flow direction of gas for power generation, the porous ribs 20L are arranged parallel to flow direction α and with a predetermined regular intervals.

According to this arrangement in array pattern, since the staggered array is formed only in a portion of the gas flow path, pressure loss may be reduced, and, as a result of reducing the pressure loss, auxiliary load is reduced thereby increasing the output of the fuel cell A.

Figure 9:
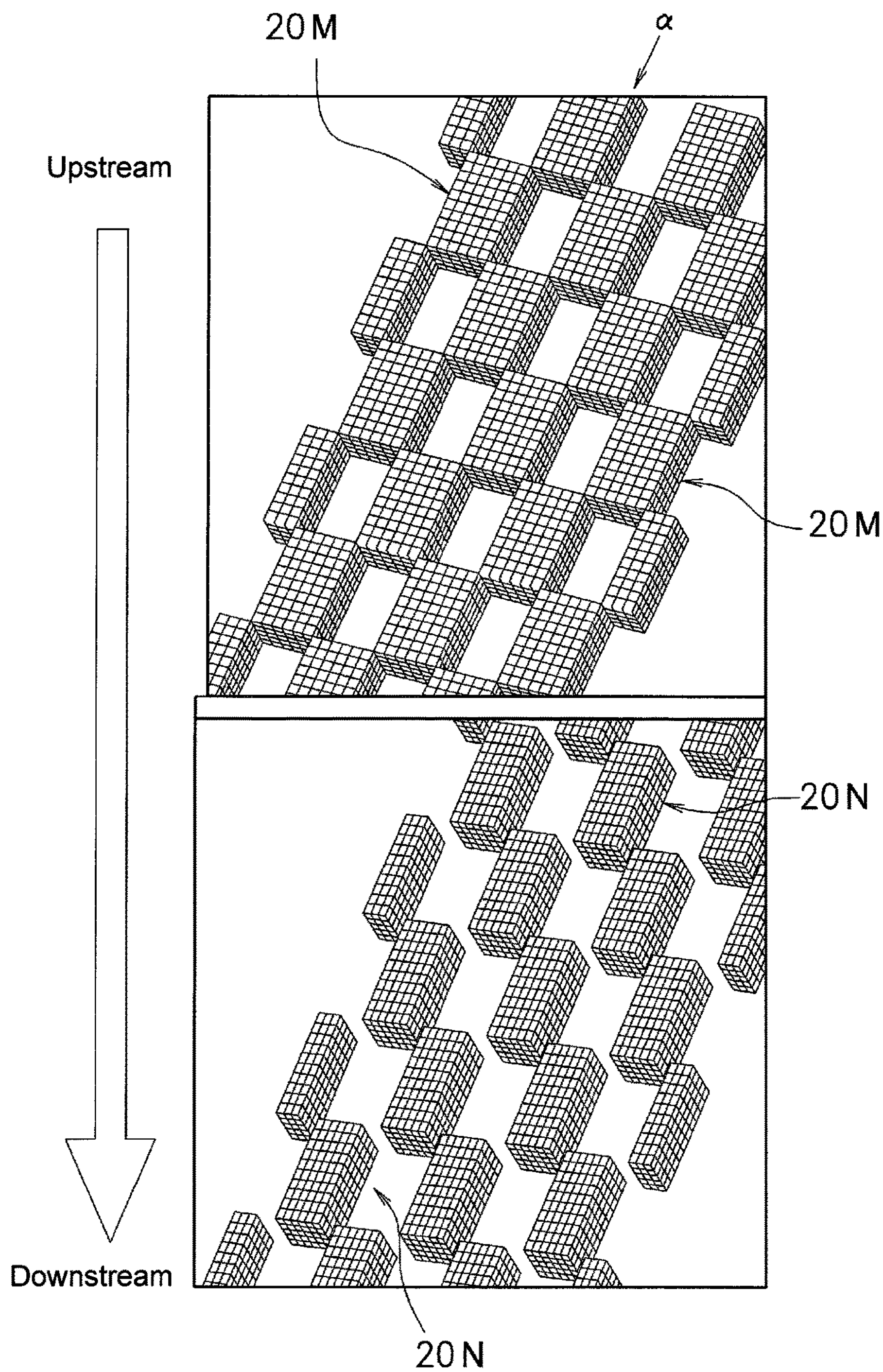
FIG. 9 is an explanatory diagram showing an array pattern of porous ribs pertaining to a fifth modification.

FIG. 9 is an explanatory diagram showing an array pattern of porous ribs pertaining to a fifth modification. In the array pattern of porous ribs pertaining to the fifth modification, on a half portion upstream with respect to flow direction α of gas for power generation, as in the array pattern of porous ribs according to either first modification or second modification, porous ribs 20M are arranged in a staggered manner with the adjacent porous ribs 20M contacting closely each other whereas on the other half portion downstream with respect to the flow direction of gas for power generation, the porous ribs 20N are arranged in a staggered manner with the adjacent porous ribs 20N spaced from each other with a required spacing.

According to this arrangement in array pattern, since the staggered array is formed only partly in the gas flow path, pressure loss may be reduced, and, as a result of reducing the pressure loss, auxiliary load is reduced thereby increasing the output of the fuel cell A.
Further, electric resistance may be reduced on the upstream half portion, and while reducing the oxygen resistance on the downstream half portion, liquid water may be discharged as well.

Figure 10:
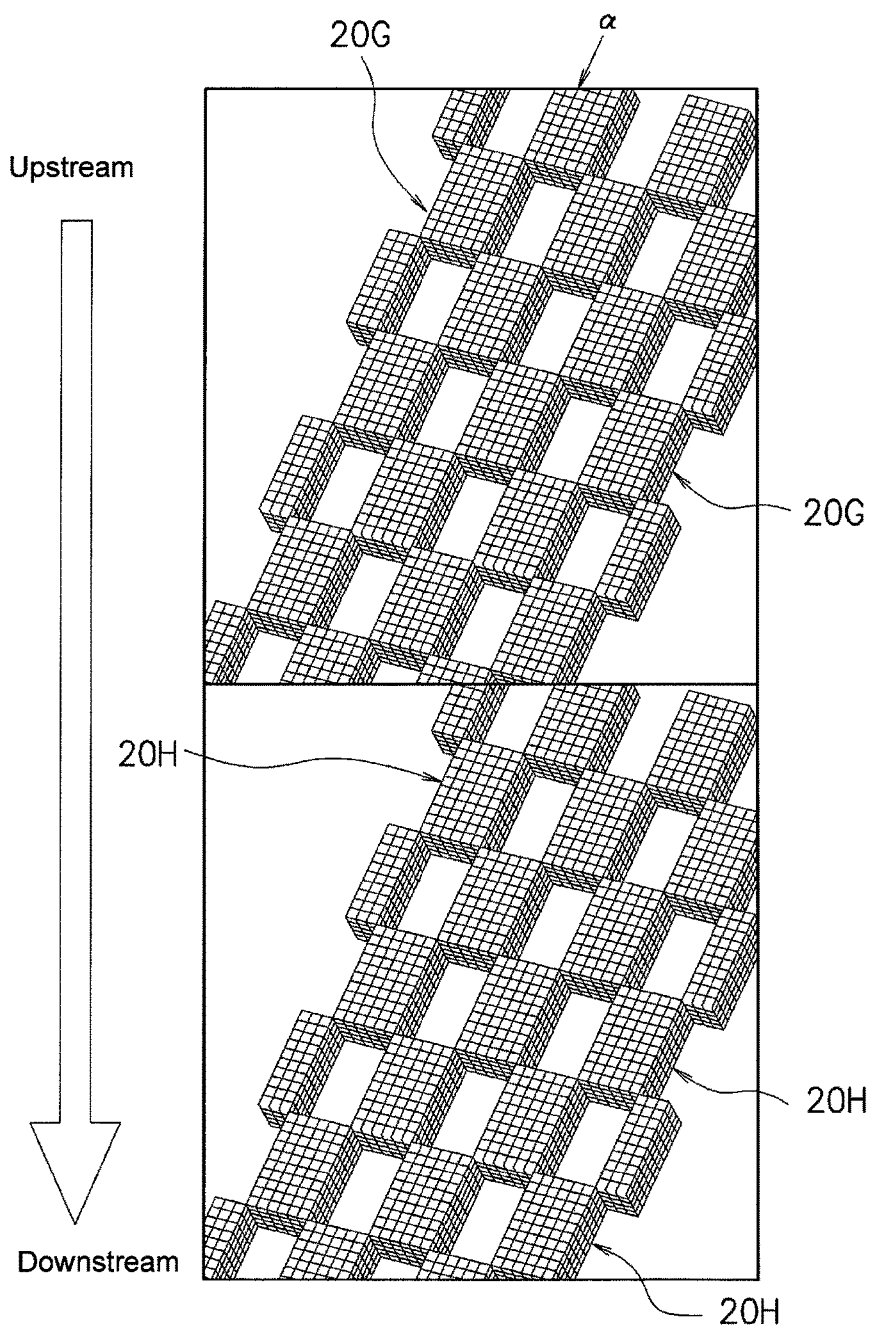
FIG. 10 is an explanatory diagram showing an array pattern of porous ribs pertaining to a sixth modification.

FIG. 10 is an explanatory diagram showing an array pattern of porous ribs pertaining to a sixth modification. In the array pattern of porous ribs pertaining to the sixth modification, on a half portion upstream with respect to flow direction α of gas for power generation, porous ribs 20G of small gas permeability are disposed in a staggered manner while being in contact with each other whereas on the other half portion downstream with respect to the flow direction of gas for power generation, the porous ribs 20H of a larger permeability than that disposed on the upstream side are arranged in a staggered manner while being contact with each other.

Figure 11:
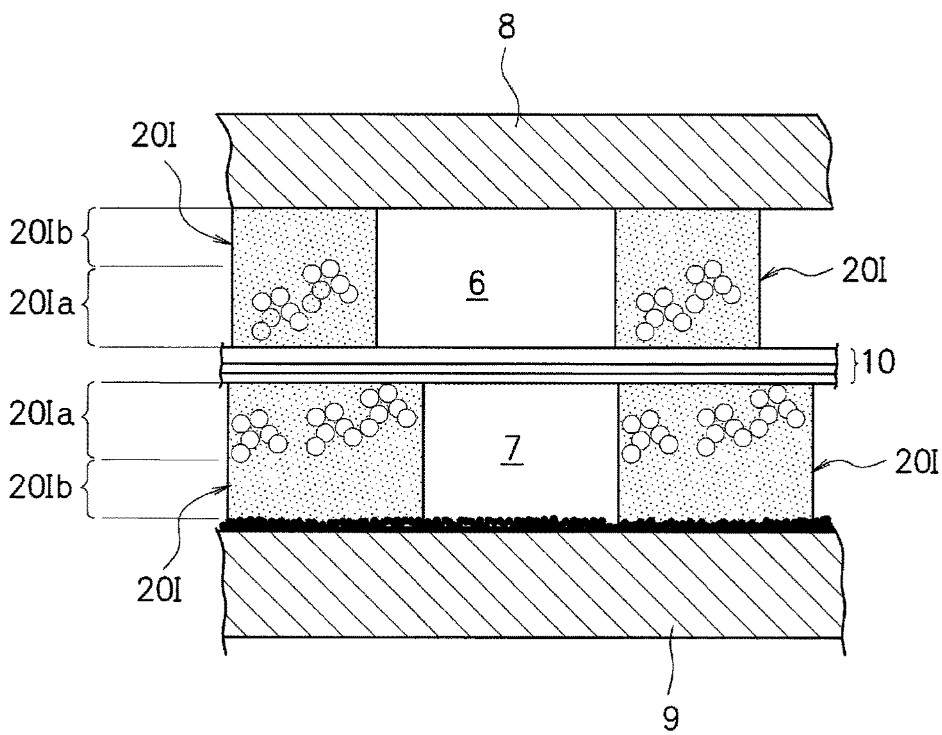
FIG. 11 is a partial exploded view showing an example of porous ribs configuring the array pattern in each embodiment.

FIG. 11 is a partial exploded view showing an example of porous ribs configuring the array pattern in each embodiment. Note that, with respect to parts equivalent to those described in the above embodiments, the same reference signs are attached without the accompanying descriptions.

In the porous ribs 20I pertaining to this example, the gas permeability is varied from the side of cell structure 10 toward the separator 10. More specifically, the rib is made porous on the base end side half portion 20Ia on the side of the cell structure 10, and the tip end side 201*b* is made solid. With this configuration, it is possible to reduce the electrical resistance of the porous rib 201. In this way, it is possible to reduce the resistance overvoltage so as to improve the voltage of the fuel cell A.

Figure 12:
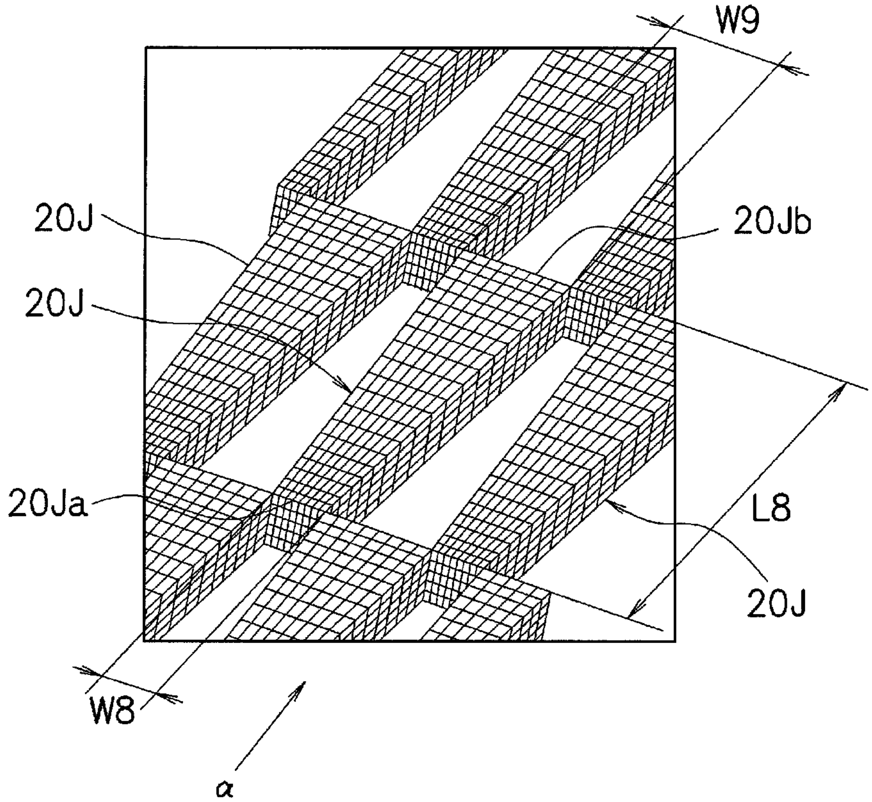
FIG. 12 is a partial perspective view showing an array pattern of porous ribs pertaining to a seventh modification.

Note that the present invention is not limited to the embodiments described above, but the following modifications are possible. FIG. 12 is a partial perspective view showing an array pattern of porous ribs pertaining to a seventh modification. The porous ribs 20J pertaining to the seventh modification constituting an array pattern of porous ribs shown in FIG. 12 is similar to the porous ribs 20A to 20I in that the porous ribs 20J are disposed between the separators 8, 9 described above and cell structure 10, i.e., in the gas passages or channels 6, 7.

The porous rib 20J constituting the array pattern of porous ribs pertaining to the present example is formed in a trapezoidal shape in plan view of a predetermined thickness and with the length W8, W9 (hereinafter referred to "rib width") along the edge 20Ja, 20Jb perpendicular to the flow direction a described above such that W8 is less than W9 (i.e., W8<W9) further with the length L8 between edges 20Ja and 20Jb.

In other words, with respect to the flow direction a of gas for power generation, the gas passage area is shaped to increase. Furthermore, in the present example, porous ribs are arranged to form a staggered pattern in which the apex portions contact each other. In other words, porous ribs 20J are arranged in the gas passage 6, 7 across the entire cross-section area of gas passage 6, 7 perpendicular to the flow direction of gas for power generation. The rib width W8 of the upstream and downstream side edges 20Ja, 20Jb is set at 100 μm or less, and, the aspect ratio between upstream and downstream side edges 20Ja, 20Jb and edges 20Cc, 20Cd is set beyond 3. Thus, compared to the arrangement with the ratio between 1 and 3, the structure is less vulnerable to damage.

By the porous rib 20J constituting the array pattern described above, the amount of gas for power generation passing through the 20J may be forced to porous ribs 20J. Therefore, the amount of gas passing through inside the porous ribs may be increased, and the oxygen diffusion into the catalyst layer closest to porous ribs 20J is enhanced to improve the cell voltage by reducing the resistance overvoltage.

Further, in the porous ribs 20J, since the gas passage area of power generation is shaped to increase with respect to the flow directionα from the upstream side to the downstream side, the gas for power generation passing through the porous rib 20J is imparted directivity. Furthermore, by passing gas obliquely in the porous rib 20J, even with such a porous rib of low permeability with respect to gas passage, the flow velocity of gas for power generation may be increased.

In the above described embodiments, the examples have been described with an array of porous ribs on the inner surface of separator disposed upon the cell structure. However, the porous ribs may be formed on the cell structure.

Two or more kinds of porous ribs different in contour from one another may be disposed to be mixed from the upstream side toward the downstream side in the flow direction of the gas for power generation.

The invention claimed is:

1. A fuel cell comprising:

a plurality of unit cell structures, each unit cell structure including a cell structure including an anode, a cathode and an electrolyte membrane, the anode and the cathode being laminated on opposite sides of the electrolyte membrane, respectively; a pair of separators disposed on both surfaces of the cell structure with gas passages being defined by the separators and the cell structure for circulating two types of gas for power generation; and a plurality of at least partially porous ribs disposed between each of the separators and the cell structure, at least part of the porous ribs being disposed successively on an entire cross-section of the gas passage in a transverse direction with a flow direction of the gas such that the gas flows through the plurality of bodies of the at least partially porous ribs for power generation, the porosity of each rib defining a non-linear gas flow path through a majority of the body of the rib, and adjacent ribs in the gas flow direction being spaced from one another in the gas flow direction, at least one rib contacting at least four different ribs in the gas flow direction and adjacent ribs being spaced from one another in the transverse direction to the gas flow direction.

2. The fuel cell according to claim 1, wherein at least the part of the porous ribs are arranged in a staggered manner with adjacent ones of the porous ribs in contact each other.

3. The fuel cell according to claim 1, wherein a ratio of a volume of the gas passages with respect to an entire volume of the porous ribs is set 1 and 3.

4. The fuel cell according to claim 1, wherein the porous ribs have an average rib width that is approximately equal to a length of the porous ribs.

5. The fuel cell according to claim 1, wherein the porous ribs have a rib width that increases an upstream side toward a downstream side with respect to a flow direction of the gas for power generation.

6. The fuel cell according to claim 2, wherein the porous ribs are disposed on an upstream side with respect to the flow direction of the gas for power generation.

7. The fuel cell according to claim 1, wherein the porous ribs have a gas permeability that varies with respect to the flow direction of the gas for power generation.

8. The fuel cell according to claim 7, wherein the gas permeability is increased gradually from an upstream side with respect to the flow direction of the gas for power generation.

9. The fuel cell according to claim 1, wherein the cell structure has a gas permeability that varies from the cell structure toward the separators.

10. The fuel cell according to claim 1, wherein the porous ribs includes at least two different kinds of porous ribs with different contours from one another that are disposed mixedly from an upstream side toward a downstream side in the flow direction of the gas for power generation.

11. The fuel cell according to claim 1, wherein the pair of separators define upper and lower planes, the gas flow direction being between the pair of separators such that the gas flow direction is substantially parallel to the upper and lower planes.

12. The fuel cell according to claim 1, wherein the plurality of at least partially porous ribs are gas permeable.

* * * * *